United States Patent
Sutton et al.

(10) Patent No.: US 10,227,132 B2
(45) Date of Patent: Mar. 12, 2019

(54) ROTORCRAFT ROTOR BLADE ASSEMBLY

(71) Applicant: Bell Helicopter Textron Inc., Fort Worth, TX (US)

(72) Inventors: Drew Sutton, Hurst, TX (US); Paul K. Oldroyd, Azle, TX (US); James Braswell, Jr., Colleyville, TX (US); Scott Wolthuis, Weatherford, TX (US); Paul Sherrill, Grapevine, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 277 days.

(21) Appl. No.: 14/817,442

(22) Filed: Aug. 4, 2015

(65) Prior Publication Data

US 2017/0036759 A1 Feb. 9, 2017

(51) Int. Cl.
*B64C 27/473* (2006.01)

(52) U.S. Cl.
CPC .... *B64C 27/473* (2013.01); *B64C 2027/4736* (2013.01)

(58) Field of Classification Search
CPC ............... B64C 27/473; B64C 27/467; B64C 2027/4736; Y10T 29/49332; B29D 99/0025
See application file for complete search history.

(56) References Cited

U.S. PATENT DOCUMENTS

| | | | | |
|---|---|---|---|---|
| 2,484,141 A | * | 10/1949 | Alex | B64C 27/473 156/185 |
| 2,767,461 A | * | 10/1956 | Lebold | B21D 53/78 264/46.6 |
| 4,810,167 A | * | 3/1989 | Spoltman | B29D 99/0025 416/229 A |
| 5,346,367 A | * | 9/1994 | Doolin | B29D 99/0025 156/213 |
| 5,417,549 A | * | 5/1995 | Purse | B64C 27/473 416/226 |
| 5,840,399 A | * | 11/1998 | Kozel | B29C 70/24 428/102 |
| 7,771,173 B2 | | 8/2010 | Leahy et al. | |
| 9,771,152 B2 | | 9/2017 | Thomas et al. | |

FOREIGN PATENT DOCUMENTS

| | | |
|---|---|---|
| EP | 2708463 A1 | 3/2014 |
| EP | 3127808 A1 | 2/2017 |
| FR | 2988692 | 10/2013 |

OTHER PUBLICATIONS

European Patent Office, European Search Report for EP Appl. No. 16172820.9 dated Dec. 19, 2016, 4 pp.
European Patent Office, Communication pursuant to Article 94(3) EPC for EP Appl. No. 16172820.9 dated Jan. 13, 2017, 6 pp.

\* cited by examiner

*Primary Examiner* — Jason D Shanske
*Assistant Examiner* — Joshua R Beebe

(57) ABSTRACT

A rotorcraft rotor blade assembly includes an upper skin portion extending substantially a full span of the rotor blade assembly and a lower skin portion extending substantially the full span of the rotor blade assembly. Each of the upper skin portion and the lower skin portion is configured to carry at least substantially 30% of rotor blade assembly loads.

34 Claims, 9 Drawing Sheets

ROTORCRAFT ROTOR BLADE ASSEMBLY

TECHNICAL FIELD

This specification relates to rotor blade assemblies, for example, assemblies of main rotor blades or other rotor blades, of a rotorcraft.

BACKGROUND

Rotorcrafts such as helicopters include rotor blades, for example, main rotor blades and tail rotor blades. A conventional rotorcraft rotor blade derives a vast majority of its strength and stiffness from an internal torque tube, often referred to as a spar or D-spar. The remaining volume within a rotor blade is occupied, in part, by a core made of a material such as honeycomb core. An upper skin portion and a lower skin portion are adhesively bonded to the spar and core. In such a conventional rotor blade, skins are members whose curvature creates aerodynamic loads as the outer contour interacts with fluid. Such skins are thin and serve as aerodynamic fairings that provide a proportionally small amount of the load carrying capability of the rotor blade.

SUMMARY

This specification describes technologies relating to rotorcraft rotor blade assemblies. Some examples of the rotorcraft rotor blade assemblies described here can include a stub spar that spans less than a full span of the rotor blade. Some examples of the rotorcraft rotor blade assemblies described here can include thick skins. Some examples of the rotorcraft rotor blade assemblies described here can include combinations of a stub spar and thick skins.

Certain aspects of the subject matter described here can be implemented as a rotorcraft rotor blade assembly. The rotorcraft rotor blade assembly includes an upper skin portion and a lower skin portion. The upper skin portion extends substantially a full span of the rotor blade assembly. The lower skin portion extends substantially a full span of the rotor blade assembly. Each of the upper skin portion and the lower skin portion is configured to carry at least substantially 30% of rotor blade assembly loads.

This, and other aspects, can include one or more of the following features. Each of the upper skin portion and the lower skin portion is configured to carry at least substantially 30% of rotor blade assembly loads by less than substantially 50% of the full span of the rotor blade assembly. Each of the upper skin portion and the lower skin portion tapers from an inboard end of the rotor blade assembly towards the outboard end. A thickness of each of the upper skin portion and the lower skin portion at an inboard end of the rotor blade assembly is about ten times a thickness of each of the upper skin portion and the lower skin portion at an outboard end of the rotor blade assembly. To carry at least substantially 30% of rotor blade assembly loads, each of the upper skin portion and the lower skin portion includes composite material fibers oriented to carry torsional rotor blade assembly loads and centrifugal rotor blade assembly loads. The rotor blade assembly excludes a spar. Alternatively, the rotor blade assembly includes a stub spar which extends less than a full span of the rotor blade assembly. The stub spar extends up to 50% of the full span of the rotor blade assembly. The stub spar is positioned at an inboard end of the rotor blade assembly. The stub spar tapers as the stub spar extends away from the inboard end of the rotor blade assembly. A ratio of a quantity of upper skin portion material and lower skin portion material to a quantity of stub spar material at the inboard end is about 60:40. The ratio increases along the full span of the rotor blade assembly from the inboard end to the outboard end.

Certain aspects of the subject matter described here can be implemented as a method of manufacturing a rotor blade assembly. An upper skin portion is formed to extend substantially a full span of the rotor blade assembly. A lower skin portion is formed to extend substantially the full span of the rotor blade assembly. Each of the upper skin portion and the lower skin portion includes composite material to carry at least substantially 30% of rotor blade assembly loads. The upper skin portion is attached to the lower skin portion.

This, and other aspects, can include one or more of the following features. To form the upper skin portion and the lower skin portion, composite material to carry at least substantially 30% of rotor blade assembly loads by less than substantially 50% of the full span of the rotor blade assembly can be included in each of the upper skin portion and the lower skin portion. Each of the upper skin portion and the lower skin portion can be formed to taper from an inboard end of the rotor blade assembly towards the outboard end. Each of the upper skin portion and the lower skin portion is formed such that a thickness of each of the upper skin portion and the lower skin portion at an inboard end of the rotor blade assembly is about ten times a thickness of each of the upper skin portion and the lower skin portion at an outboard end of the rotor blade assembly. A stub spar is positioned between the upper skin portion and the lower skin portion. The stub spar extends less than a full span of the rotor blade assembly. The upper skin portion and the lower skin portion are attached to the stub spar. The stub spar extends up to 50% of the full span of the rotor blade assembly. The stub spar is formed to taper as the stub spar extends away from the inboard end of the rotor blade assembly. A ratio of a quantity of upper skin portion material and lower skin portion material to a quantity of stub spar material at the inboard end is about 60:40. The ratio increases along the full span of the rotor blade assembly from the inboard end to the outboard end.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

A conventional rotorcraft rotor blade derives a vast majority of its strength and stiffness from an internal torque tube, often referred to as a spar or D-spar. The remaining volume within a rotor blade is occupied, in part, by a core made of a material such as honeycomb core. An upper skin portion and a lower skin portion are adhesively bonded to the spar and core. In such a conventional rotor blade, skins are members whose curvature create aerodynamic loads as the outer contour interacts with fluid. Such skins are thin and serve as aerodynamic fairings that provide little, if any, structural stiffness to the rotor blade.

A rotor blade can include different types of material, for example, centrifugal material, torque material, shear material or other material. Centrifugal material can include, for example, composite material (such as fibers or other composite material) aligned substantially span-wise on the span of the rotor blade and configured to carry centrifugal loads on the rotor blade. Torque material can include, for example, composite material (such as fibers or other composite material) torsionally wound (for example, around the spar or around the skin or both), along the span of the blade. Shear material can include, for example, composite material (such as fibers or other composite material) which serves to capture and direct energy from outboard discrete elements, for example, abrasion strip, trailing edge or other elements, toward the blade attach bolt hole locations near the inboard end where all blade loads resolve. The shear material can include a combination of dominantly torque material and some centrifugal material or chord-wise material (or both).

Figure 1A:
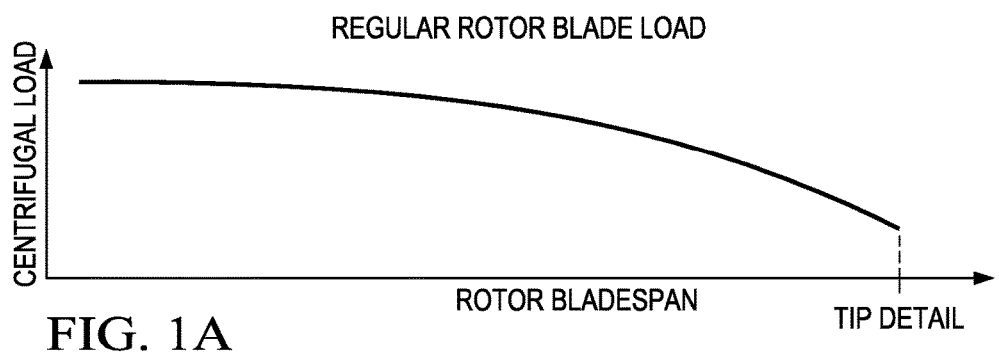
FIGS. 1A-1E are example plots showing loads on a rotor blade.
Figure 1B:
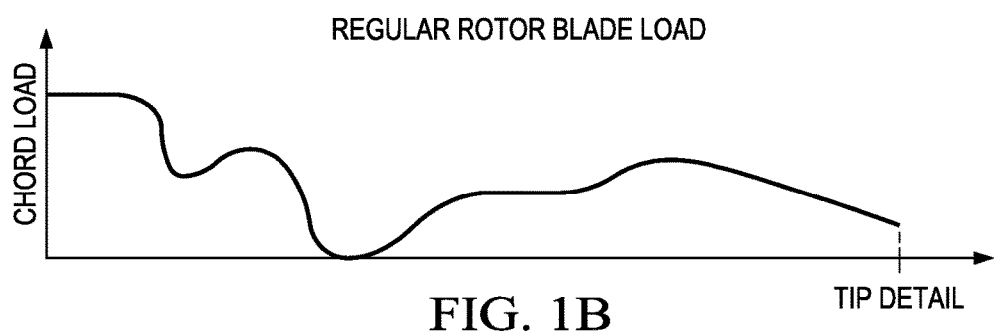
Figure 1C:
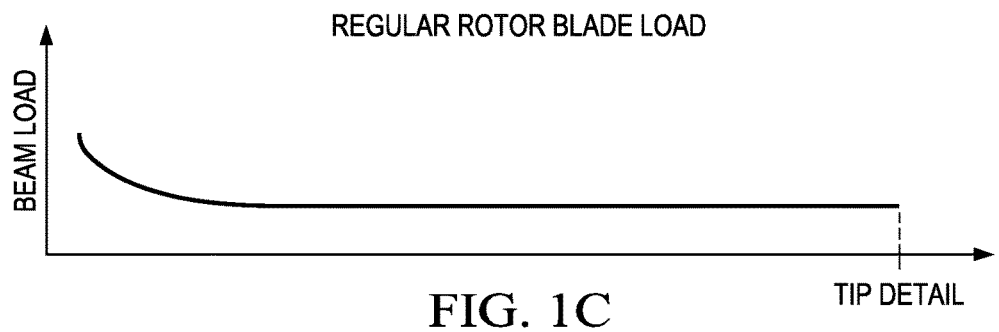
Figure 1D:
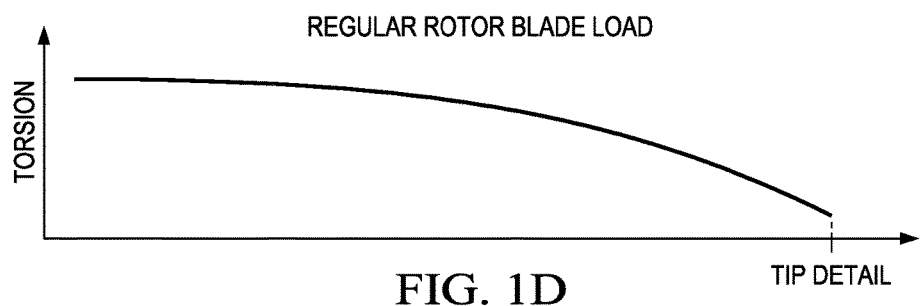
Figure 1E:
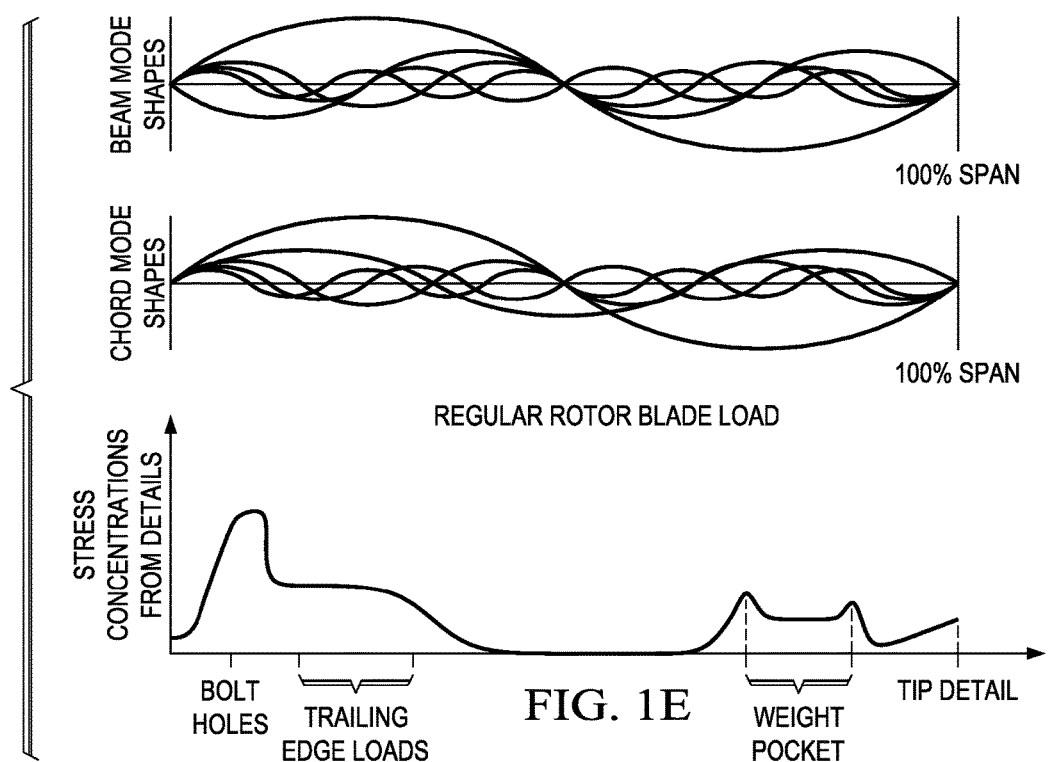
Figure 2A:
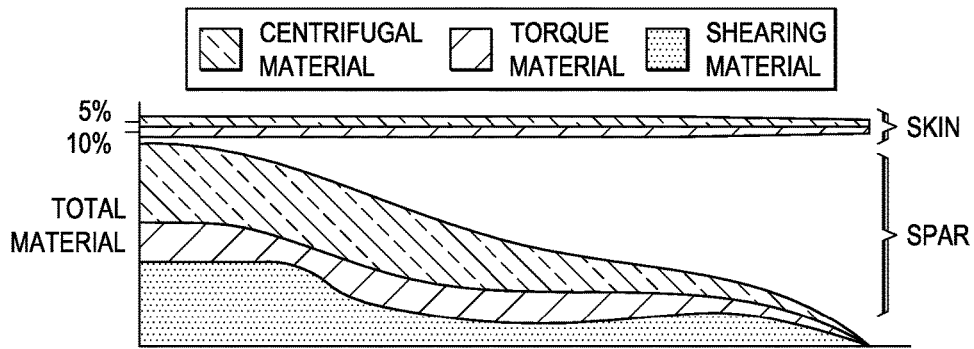
FIG. 2A is an example plot showing, for a conventional rotor blade, a distribution of different materials of the rotor blade.

FIGS. 1A-1E are example plots showing loads on a rotor blade. Each of FIG. 1A, FIG. 1B, FIG. 1C, FIG. 1D and FIG. 1E show centrifugal loads, chord loads, beam loads, torsion, and hard detail, respectively, along a span of a rotor blade. FIG. 2A is an example plot showing, for a conventional rotor blade, a distribution of different materials of the rotor blade. As shown in FIG. 2A, the spar, which spans substantially an entire span of the rotor blade, is configured to carry a significant portion of centrifugal, torsional and shearing loads. To do so, the spar is manufactured to include sufficient quantities of centrifugal material, torsional material and shear material. In comparison, the skin material is configured to carry significantly smaller quantities of the loads because the skins do not serve as significant structural elements in the conventional rotor blade. Therefore, the skins are manufactured to include significantly smaller quantities of material relative to the spar. Thus, the total load carried by the conventional rotor blade is dominantly carried by the spar compared to the skins.

Figure 2B:
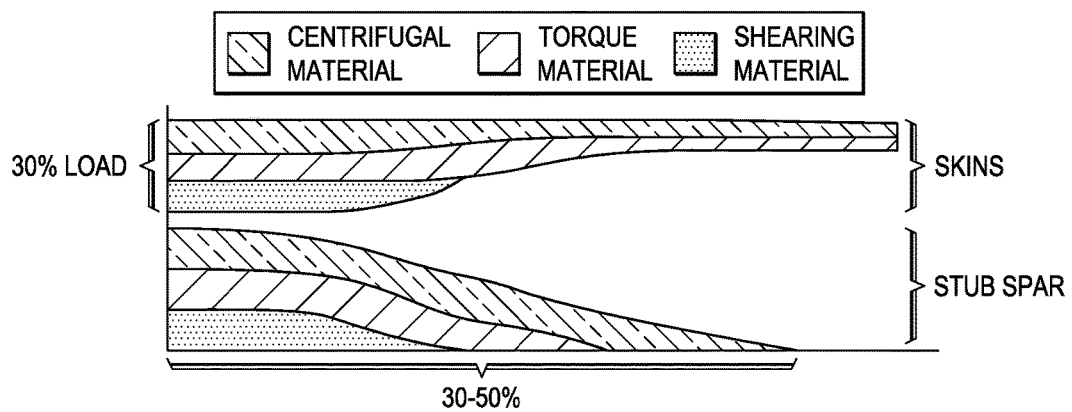
FIG. 2B is an example plot showing a distribution of different materials of a rotor blade having a stub spar with thick skins.
Figure 2C:
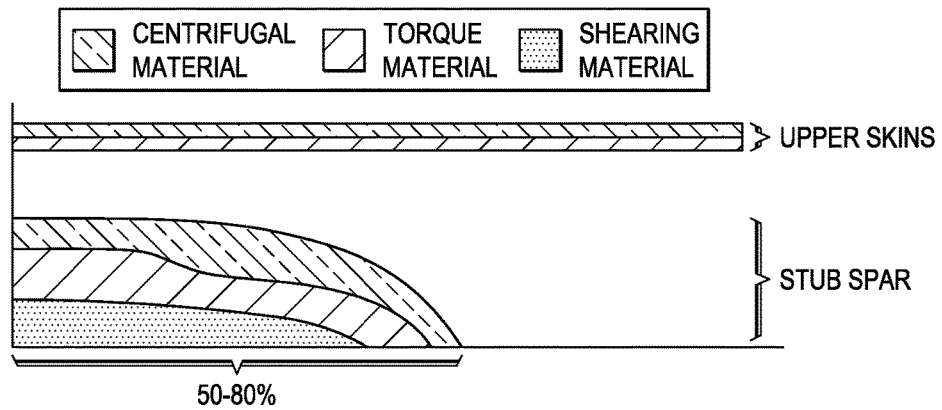
FIG. 2C is an example plot showing a distribution of different materials of a rotor blade having a stub spar with thin skins.
Figure 2D:
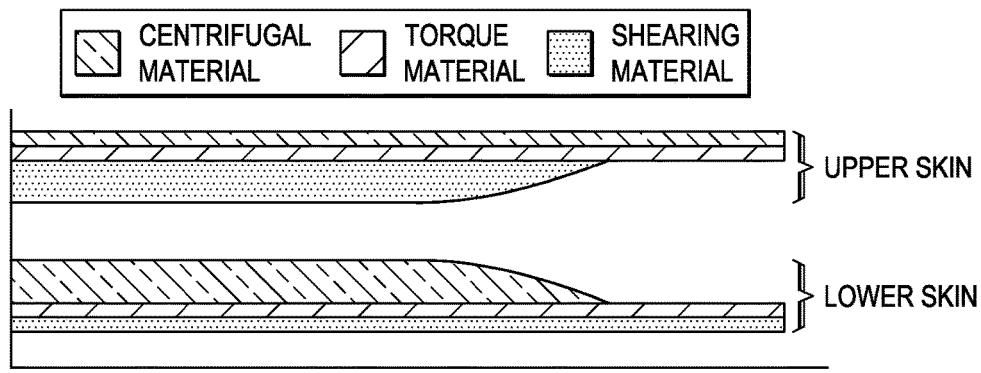
FIG. 2D is an example plot showing a distribution of different materials of a rotor blade having thick skins but no stub spar.

This application describes alternative rotor blade assemblies in which the skins carry a significantly greater portion of the loads compared to the conventional rotor blade. FIG. 2B is an example plot showing a distribution of different materials of one such rotor blade assembly, which has a stub spar with thick skins. FIG. 2C is an example plot showing a distribution of different materials of another such rotor blade assembly, which has a stub spar with thin skins. FIG. 2D is an example plot showing a distribution of different materials of another rotor blade assembly, which has thick skins but no stub spar. Details of such rotor blade assemblies are described below.

Figure 3A:
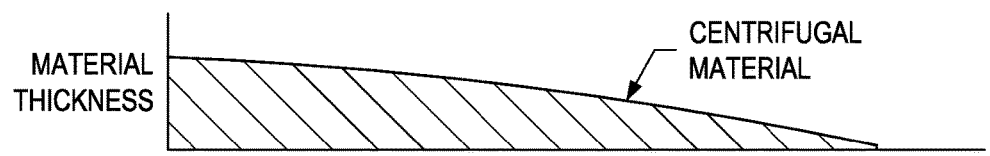
FIGS. 3A-3C show plots of material distribution along the span of such an example rotor blade assembly.
Figure 3B:
Figure 3C:

FIGS. 3A-3C show plots of material distribution along the span of such an alternative blade assembly. FIG. 3A shows a quantity of centrifugal material in the skins. Compared to the quantity of centrifugal materials in the skins of a conventional rotor blade (FIG. 2), the quantity of centrifugal materials in the skins of the alternative rotor blade assembly is greater. In particular, the quantity of centrifugal materials is greater near an inboard end of the blade and decreases towards the outboard end of the blade. FIG. 3B shows that a quantity of torque material in the spar. Compared to the quantity of torque material in the spar of a conventional rotor blade (FIG. 2), the quantity of torque material in the spar of the alternative rotor blade assembly can be the same or less. In addition, compared to the quantity of torque material in the skins of a conventional rotor blade (FIG. 2), the quantity of torque material in the skins of the alternative rotor blade assembly is greater. Consequently, the quantity of the torque material is substantially constant along the span of the rotor blade. The quantity of shear material in the conventional rotor blade (FIG. 2) and the alternative rotor blade assembly can be substantially the same. In particular, FIG. 3C shows that a quantity of shear material is greater near the inboard end of the rotor blade and decreases towards the outboard end of the rotor blade with a tapering down along the span.

Thus, this application describes a rotor blade assembly and methods of manufacturing the rotor blade assembly by which the total load carried mostly by the spar of a conventional rotor blade is now split into constituent loads (for example, centrifugal loads, torsional loads, shearing loads), each of which is partially carried by the spar and the skins. As described below, the spar of the alternative rotor blade assembly can, consequently, be thinner than and manufactured using lesser material compared to the spar of the conventional rotor blade. Because complexity and cost of manufacture increases exponentially with thickness, the alternative rotor blade assembly can be easier and cheaper to manufacture compared to the conventional rotor blade. For example, a spar that has half the thickness of a spar of the conventional rotor blade assembly may cost one-quarter or one-sixteenth the cost of the spar of the conventional rotor blade. Disassembling and inspecting the alternative rotor blade assembly can also be simplified relative to the conventional rotor blade.

I. Rotor Blade Assembly Including a Stub Spar

Figure 4:
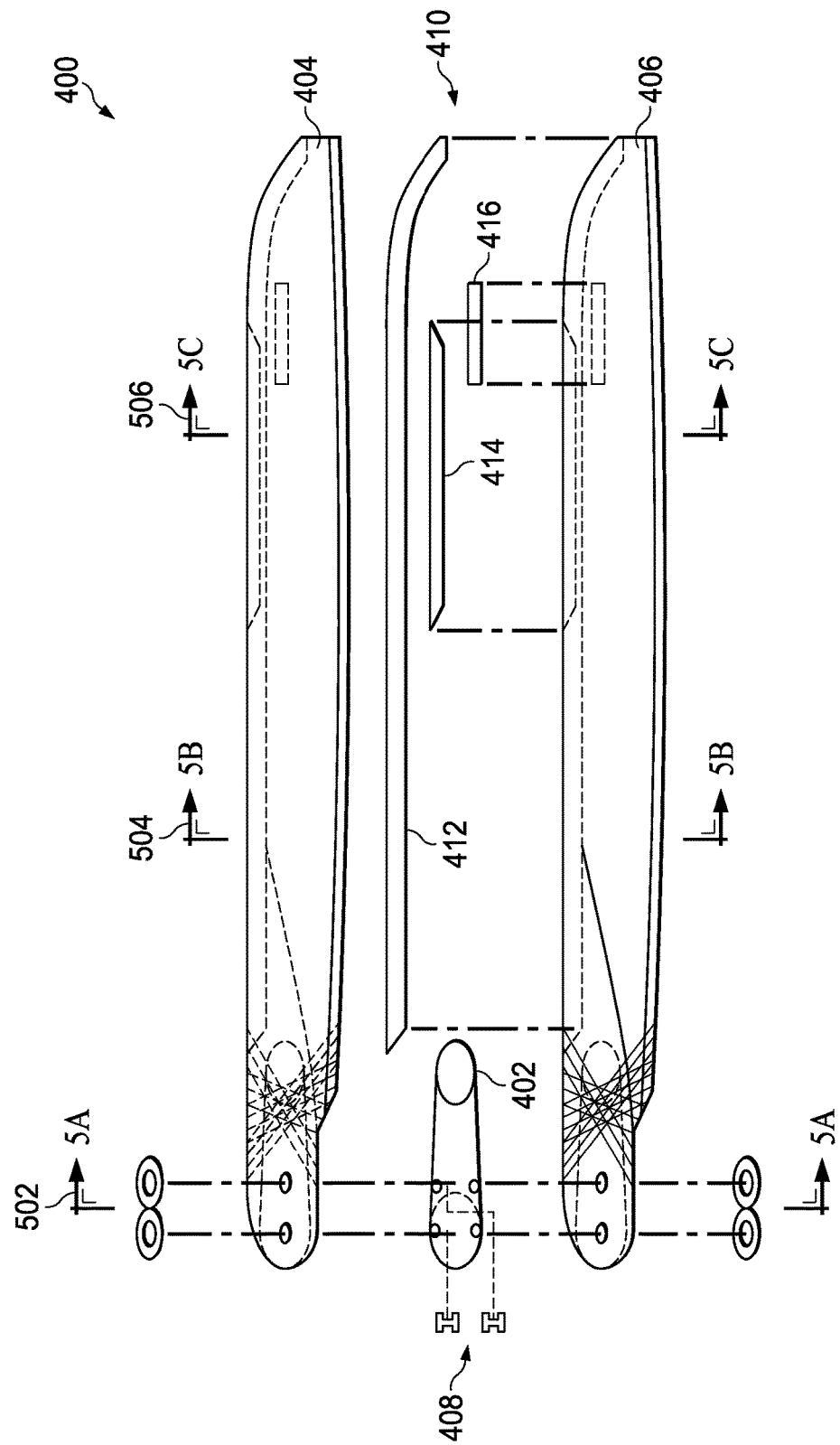
FIG. 4 is a schematic drawing of an example rotor blade assembly.

FIG. 4 is a schematic drawing of an example rotor blade assembly 400. The assembly 400 includes a stub spar 402 extending less than a full span of the assembly 400. The assembly 400 includes an upper skin portion 404 and a lower skin portion 406, each extending substantially the full span of the assembly 400. The stub spar 402 is positioned between the upper skin portion 404 and the lower skin portion 406. In some implementations, the stub spar 402 can extend up to the near a middle of the full span of the assembly 400. The full span of the assembly 400 can extend from an inboard end 408 of the assembly 400 to an outboard end 410 of the assembly 400.

Near the middle of the full span of the assembly 400 can be, for example, 50% of the full span of the assembly 400 or substantially 50% of the full span of the assembly 400. Having the stub spar 402 span substantially 50% of the full span of the assembly 400 can include having the stub spar 402 extend between 10% and less than 50% (for example, substantially one-tenth to one-third) of the full span of the assembly 400. In general, a shorter stub spar can be easier and cheaper to manufacture relative to a longer stub spar. Depending on a length of the stub spar 402, a quantity of material (e.g., torque material, centrifugal material, shear material or other material) of the stub spar 402 can vary. For example, a shorter stub spar can have more material than a comparatively longer stub spar. Alternatively, the shorter stub spar can have substantially the same quantity of material as a comparatively longer stub spar, and can consequently be denser than the longer stub spar.

The stub spar 402 is positioned at an inboard end 408 of the assembly 400. In some implementations, the stub spar can have a substantially constant thickness as the stub spar extends away from the inboard end of the blade assembly. The stub spar 402 tapers as the stub spar 402 extends away from the inboard end 408 of the blade assembly. A ratio of a quantity of material in the upper skin portion 404 and material in the lower skin portion 406 to a quantity of material in the stub spar 402 at the inboard end 408 can be about 60:40 (or range between 55:45 and 65:35). As the stub spar 402 tapers away from the inboard end 408 towards the outboard end 410, the ratio of the quantity of material in the upper skin portion 404 to the quantity of material in the stub spar 402 and the ratio of the quantity of material in the lower skin portion 406 to the quantity of material in the stub spar 402 increases. At the outboard end of the stub spar 402, the ratio can be about 80:20 (or in the range of 75:25 to 85:15). At the outboard end 410 of the assembly 400, the ratio is 100:0 because the stub spar 402 does not extend a full span of the assembly 400. In some implementations, the outboard end of the stub spar 402 can include between one and three plies of material. Alternative implementations of the outboard end of the stub spar can have different number of plies based on the design requirements of the stub spar.

In addition, at any cross-section along the stub spar 402, a percentage of torque material in the stub spar 402 can be greater than a percentage of torque material in either the upper skin portion 404 or the lower skin portion 406. Similarly, at any cross-section along the stub spar 402, a percentage of centrifugal material in the stub spar 402 can be less than a percentage of centrifugal material in either the upper skin portion 404 or the lower skin portion 406. For example, at any cross-section along the stub spar 402, substantially 10% (or a range of 5% to 15%) of the centrifugal material is in the stub spar 402 and the remainder of the centrifugal material is distributed between the upper skin portion 404 and the lower skin portion 406. Similarly, at any cross-section along the stub spar 402, substantially 90% (or a range of 85% to 95%) of the torque material is in the stub spar 402 and the remainder of the torque material is distributed between the upper skin portion 404 and the lower skin portion 406.

Figure 5C:
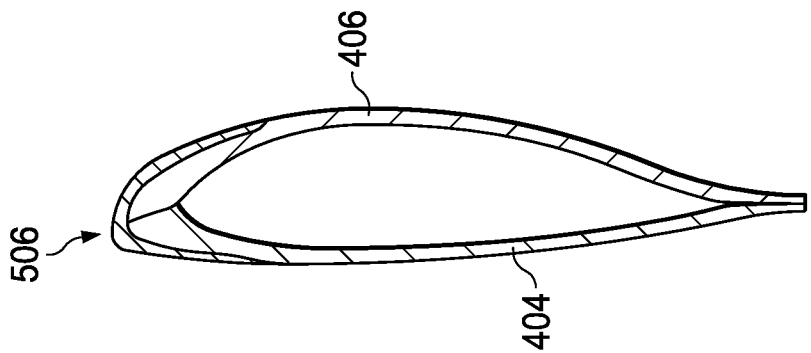
FIGS. 5A-5C show cross-sections of the rotor blade assembly at different lengths along the full span of the assembly.
Figure 5B:
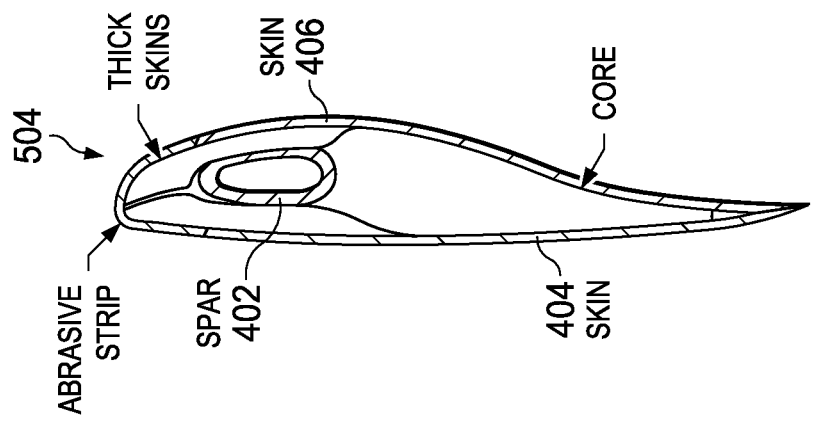
Figure 5A:
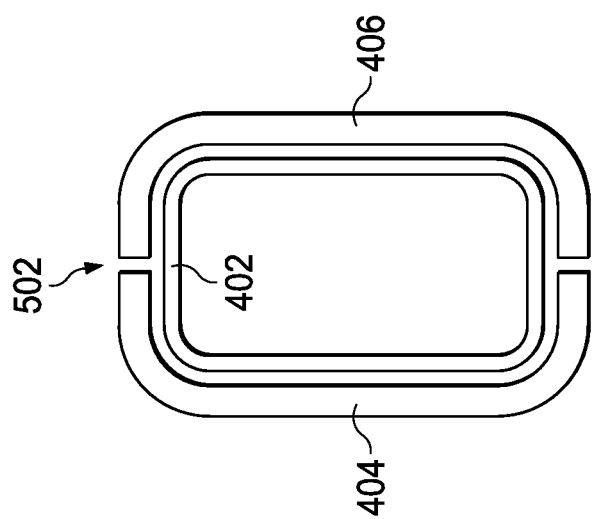

FIGS. 5A-5C show cross-sections of the rotor blade assembly 400 at different lengths along the full span of the assembly 400. FIG. 5A shows a cross-section of the assembly 400 near the inboard end 408 of the assembly 400. At this location (502) of the assembly 400, the stub spar 402 occupies a significantly larger portion than the upper skin portion 404 and the lower skin portion 406. That is, a thickness of the stub spar 402 at the location 502 is substantially greater than a thickness of the upper skin portion 404 or a thickness of the lower skin portion 406.

FIG. 5B shows a cross-section of the assembly 400 away from the inboard end 408 of the assembly 400. At this location (504), the upper skin portion 404 and the lower skin portion 406 occupy a larger portion than the stub spar 402. That is, a thickness of the stub spar 402 at the location 504 is substantially less than the thickness of the upper skin portion 404 and the lower skin portion 406. In addition, a portion occupied by the stub spar 402 at the location 504 is less than a portion occupied by the stub spar 402 at the location 502 because the stub spar 402 has tapered from the location 502 towards the location 504.

FIG. 5C shows a cross-section of the assembly 400 nearer to the outboard end 410 than to the inboard end 408. There is no stub spar at this location (506); instead, the entire portion of the assembly 400 is occupied by the upper skin portion 404 and the lower skin portion 406. It follows then that, at an intermediate location between the inboard end 408 and the outboard end 410, a thickness of the stub spar 402 is substantially equal to a thickness of the upper skin portion 404 or a thickness of the lower skin portion 406.

At locations in which the stub spar 402 is thicker than the upper skin portion 404 or the lower skin portion 406, the stub spar 402 can include more torque material (for example, torsional windings of composite fibers around a core) compared to the upper skin portion 404 or the lower skin portion 406. At locations in which the upper skin portion 404 or the lower skin portion 406 is thicker than the stub spar 402, the upper skin portion 404 or the lower skin portion 406 can include more centrifugal material (for example, composite fibers aligned substantially chord-wise on the span of the assembly 400). Alternatively or in addition, the stub spar 402 can be made thicker than the upper skin portion 404 or the lower skin portion 406 at a location by increasing a quantity of centrifugal material and torque material in the stub spar 402 at the location. Similarly, the upper skin portion 404 or the lower skin portion 406 can be made thicker than the stub spar 402 at a location by increasing a quantity of centrifugal material and torque material in the upper skin portion 404 or the lower skin portion 406 at the location.

Figure 6A:
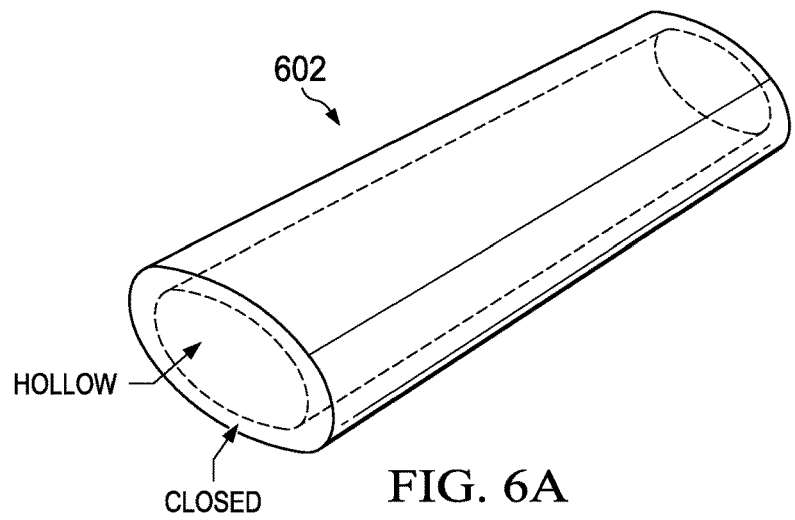
FIGS. 6A-6C show cross-sections of examples of stub spars.
Figure 6B:
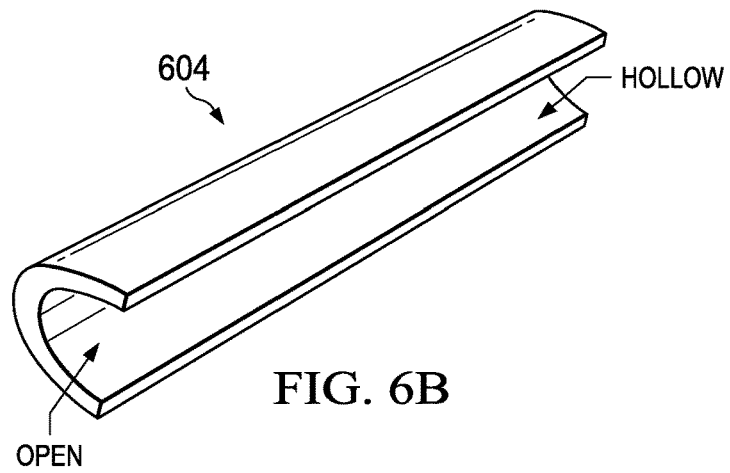
Figure 6C:
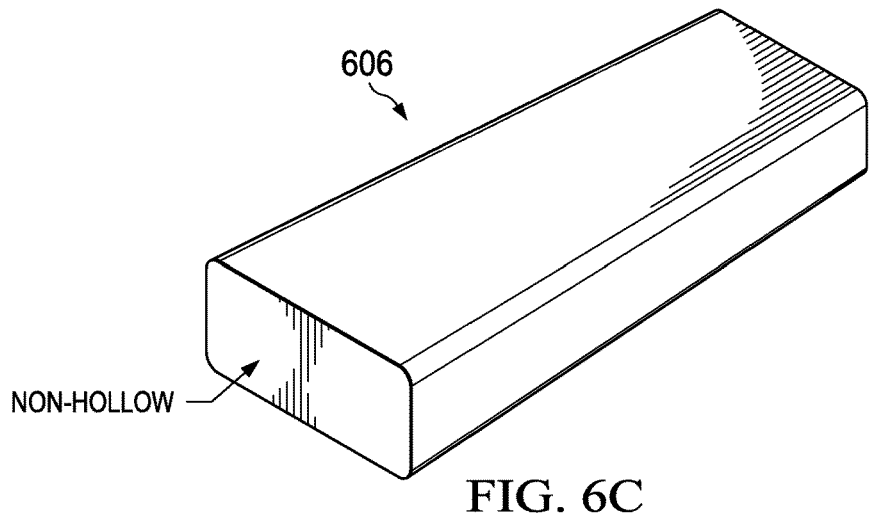

FIGS. 6A-6C show cross-sections of examples of stub spars. FIG. 6A shows a cross-section of a stub spar 602 having a closed hollow cross-section. In the implementation shown in FIG. 6A, the stub spar 602 is made of structural composite material in the shape of an elongated, tapering tube that is hollow on the inside and whose ends are covered. In addition, the cross-section of the stub spar 602 is continuous and has, for example, a circular cross-section or a non-circular (for example, elliptical or other non-circular) cross-section without terminating in edges.

FIG. 6B shows a cross-section of a stub spar 604 having an open hollow cross-section. In the implementation shown in FIG. 6B, the stub spar 604 is made of structural composite material in the shape of an elongated, tapering tube that is hollow on the inside and whose ends are open. In some implementations, the cross-section of the stub spar 604 is discontinuous and has, for example, a horse shoe cross-section or other cross-section terminating in two edges.

FIG. 6C shows a cross-section of a stub spar 606 having a non-hollow (or solid) cross-section. In the implementation shown in FIG. 6B, the stub spar 606 is made of structural composite material in the shape of an elongated, tapering tube that is filled with composite material on the inside so as to be non-hollow. In some implementations, a cross-section of the stub spar 606 can be similar to a cross-section of the stub spar 602. Thus, the stub spar 602 and the stub spar 606 can be substantially similar except that the former is hollow with closed ends while the latter is solid.

In some implementations, the stub spar 402 can include only torque material and can exclude any centrifugal material. In such implementations, the stub spar 402 can include shear material. In some implementations, the stub spar 402 can include only shear material and can exclude any torque material or centrifugal material. In some implementations, the stub spar 402 can include filler material.

In some implementations, the assembly 400 can include an abrasion strip assembly 412, a tuning weight 414 and a weight pocket 416 or any number of details required for various uses of the blade. The stub spar can be made of one of many types of constructions, for example, using only fabric plies, any number of lay ups, a multi-axis weave fabric or sock, or other constructions. The stub spar can include a scupper or a drain hole (or both) to prevent water from entering the blade. The abrasion strip assembly 412 can taper off after a sufficient overlap with the stub spar to create an abrasion strip assembly 412 that is easy to form. The abrasion strip assembly 412 can have a grounding tab integral to the assembly 400 which can run a full length inboard of the taper to cover the assembly 400.

Figure 7:
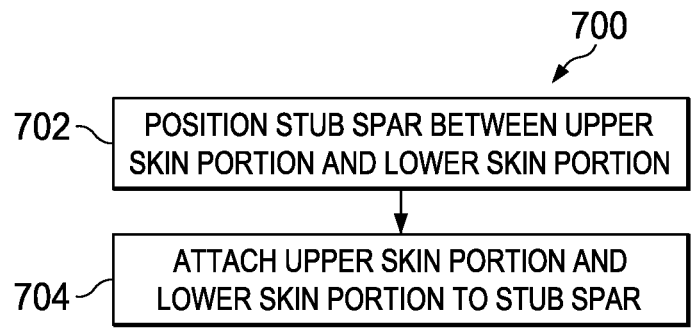
FIG. 7 is a flowchart of a process of manufacturing a rotor blade assembly.

FIG. 7 is a flowchart of a process 700 of manufacturing a rotor blade assembly, for example, the rotor blade assembly 400. At 702, a stub spar is positioned between an upper skin portion and a lower skin portion. The stub spar extends less than a full span of the rotor blade assembly. Each of the upper skin portion and the lower skin portion extend substantially the full span of the rotor blade. The stub spar can taper as the stub spar extends away from an inboard end of the rotor blade assembly. At 704, the upper skin portion and the lower skin portion are attached to the stub spar. In some implementations, a thickness of each of the upper skin portion and the lower skin portion is configured to support substantially 30% (for example, between substantially 25% and 45%) or more of the centrifugal loads by substantially 40% or less of the full span of the rotor blade assembly.

In some implementations, the upper skin portion and the lower skin portion can be attached to the stub spar by bonding or curing or both. For example, either the stub spar or the upper skin portion or the lower skin portion (or any two or all of them) can be pre-cured before positioning the stub spar between the upper skin portion and the lower skin portion. Alternatively, each of the stub spar, the upper skin portion and the lower skin portion (or any two or all of them) can be uncured. To attach the upper skin portion and the lower skin portion to the stub spar, the upper skin portion, the lower skin portion and the stub spar can be bonded after attaching the upper skin portion and the lower skin portion to the stub spar. In some implementations, the upper skin portion and the lower skin portion can be attached to each other and the stub spar can then be attached to, for example, inserted into a cavity to snap fit with, the joined upper and lower skin portions.

Figure 8:
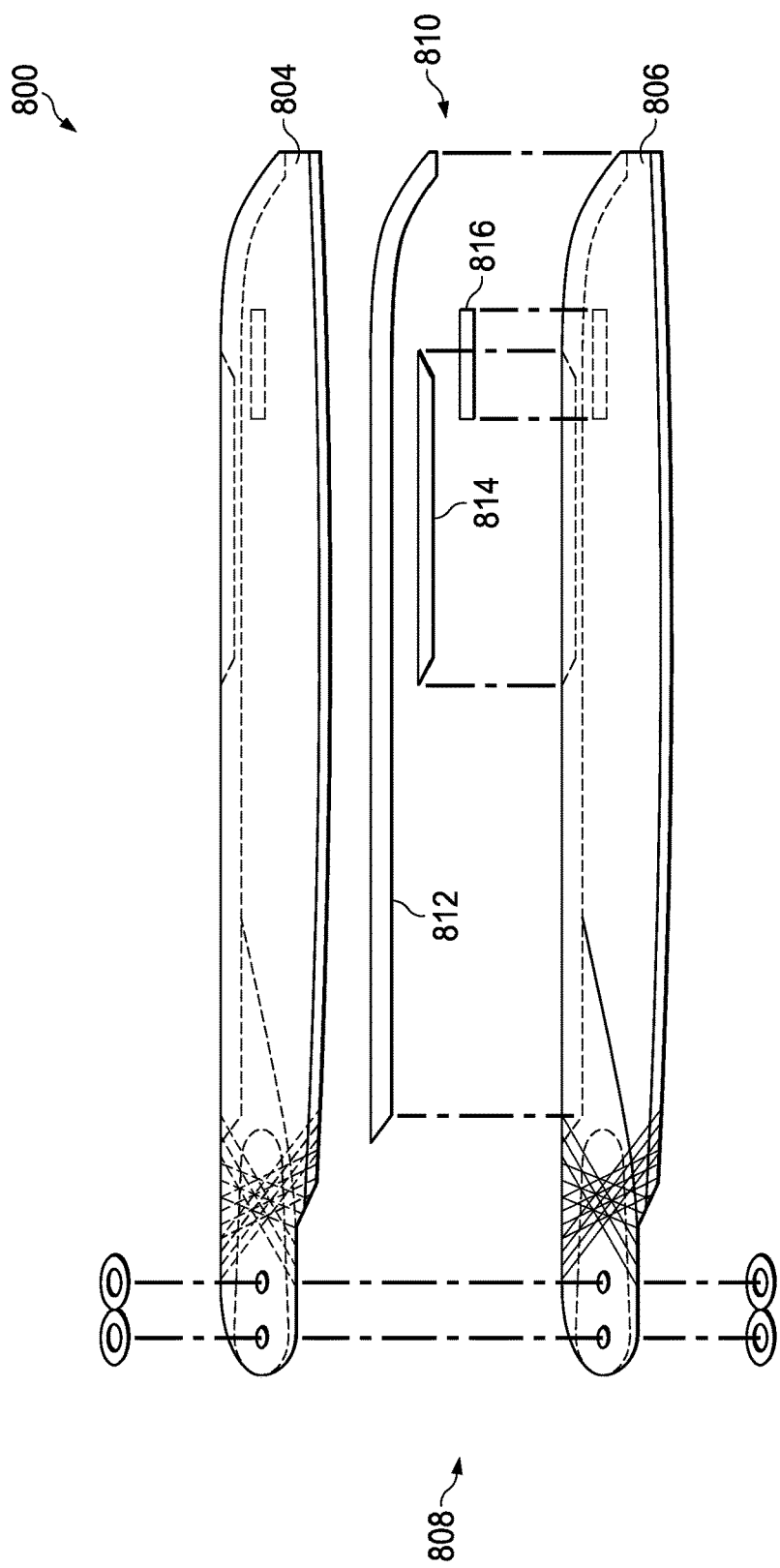
FIG. 8 is a schematic drawing of an example rotor blade assembly without a stub spar.

II. Rotor Blade Assembly Including Thick Skins:

FIG. 8 is a schematic drawing of an example rotor blade assembly 800 without a stub spar. The assembly includes an upper skin portion 804 extending substantially a full span of the assembly 800. The assembly includes a lower skin portion 806 extending substantially the full span of the rotor blade assembly 800. An inboard end portion of the upper skin portion 804 (i.e., a length of the upper skin portion 804 that is nearer the inboard end than the outboard end of the rotor blade assembly 800) is attached to an inboard end portion of the upper skin portion 804 (i.e., a length of the lower skin portion 806 that is nearer the inboard end than the outboard end of the rotor blade assembly 800). In some implementations, the inboard end portion of the upper skin portion 804 can be attached directly to the inboard end portion of the lower skin portion 806 without an intermediate member such as a spar.

In some implementations, each of the upper skin portion 804 and the lower skin portion 806 is configured to carry at least substantially 30% of the rotor blade assembly loads. As described above, the skins of a conventional rotor blade serve more as aerodynamic fairings than structural members. A percentage of the loads that such skins of the conventional rotor blade are configured to carry is very small, for example, 5%-10% of the total blade loads. The skin portions of the rotor blade assembly 800, in contrast, are configured to carry comparatively greater loads, for example, substantially 20%, 25%, 30%, 35% or more of the rotor blade assembly 800. For example, each of the upper skin portion 804 and the lower skin portion 806 is configured to carry at least substantially 30% of the rotor blade assembly loads by less than substantially one-half of the full span of the rotor blade assembly 800. Substantially one-half of the full span of the rotor blade assembly 800 can include, for example, exactly one-half or less than one-half, for example, 47%, 45%, 40%, 35% of the full span.

Each of the upper skin portion 804 and the lower skin portion 806 can be configured to carry greater loads (relative to a conventional rotor blade) by increasing a quantity of material in the upper skin portion 804 and the lower skin portion 806 compared to corresponding skins in the conventional rotor blade assembly. For example, a quantity of centrifugal material or torque material (or both) in the upper skin portion 804 can be greater than a corresponding quantity in a conventional rotor blade. Similarly, a quantity of centrifugal material or torque material (or both) in the lower skin portion 806 can be greater than a corresponding quantity in a conventional rotor blade.

In some implementations, each of the upper skin portion 804 and the lower skin portion 806 tapers from an inboard end 808 of the assembly 800 towards an outboard end 810 of the assembly 800. A thickness of each of the upper skin portion 804 and the lower skin portion 806 at the inboard end 808 can be greater than a thickness of each of the upper skin portion 804 and the lower skin portion 806 by a factor, for example, of about four, six, eight, ten or greater. For example, the outboard portion of the upper skin portion 804 or the lower skin portion 806 (or both) can each have about 3-4 plies of material. The inboard portion of the upper skin portion 804 or the lower skin portion 806 (or both) can each have about 30-40 plies of material.

In some implementations, the rotor blade assembly 800 can exclude a stub spar of any length. Alternative implementations of a rotor blade assembly having an upper skin portion and a lower skin portion similar in structure and function to the upper skin portion 804 and the lower skin portion 806, respectively, can include a stub spar that is substantially similar in structure and function to the stub spar 402 described above. In some implementations, the assembly 800 can include an abrasion strip assembly 812, a tuning weight 814 and a weight pocket 816.

Figure 9:
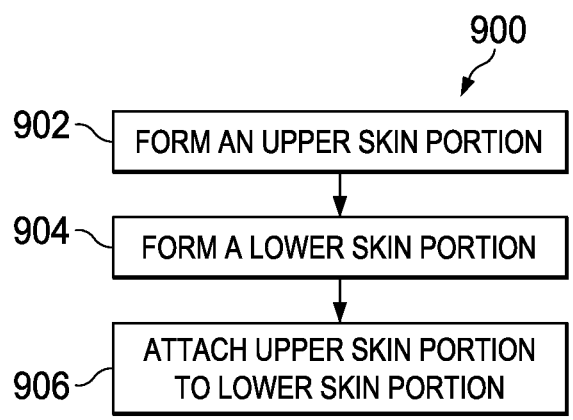
FIG. 9 is a flowchart of a process of manufacturing a rotor blade assembly.

FIG. 9 is a flowchart of a process 900 of manufacturing a rotor blade assembly. At 902, an upper skin portion is formed to extend substantially a full span of the rotor blade assembly. At 904, a lower skin portion is formed to extend substantially the full span of the rotor blade assembly. Each of the upper skin portion and the lower skin portion includes composite material to carry at least substantially 30% of rotor blade assembly loads. At 906, the upper skin portion is attached to the lower skin portion. In each of the upper skin portion and the lower skin portion, composite material to carry at least substantially 30% of rotor blade assembly loads by less than substantially 50% of the full span of the rotor blade assembly loads can be included. Each of the upper skin portion and the lower skin portion can taper from an inboard end of the assembly toward the outboard end. In some implementations, a stub spar can be positioned between the upper skin portion and the lower skin portion similar to techniques described above.

III. Methods of Manufacturing Rotor Blade Assemblies

As described above, the spar of a conventional rotor blade is used to support and react dominant structural forces of the blade while the skin creates the aerodynamic surfaces. These designs consistently have issues creating a repeatable bond between the skins and the rigid details within. These defects, which are caused by issues associated with this bond, are sometimes called skin voids and represent a significant portion of the defects in rotor blades. One technique to manufacture a rotor blade assembly with thick skins can include stacking up composite material. Doing so can cause variations in the final surface contour proportional to a thickness of the laminate due to variations in bulk and location. To address this bulk factor concern, thick skins can be tooled on the outer mold line (OML), thereby pushing the variance to the inner mold line (IML). The internal details of the blade can then be made compliant to these surface variations resulting in high quality bonds as well as aerodynamically pleasing surfaces. Resin transfer molding (or other net volume techniques) have also been used to create high quality aerodynamic surfaces with predictable mating surfaces. These techniques process place structure in a net volume mold and fill the resulting space with resin. Inner mold line (IML) tooling can be cheaper than net molding parts but can still produce a highly repeatable and reliable mating surface, for example, by reducing the number of skin voids.

One technique to describe the rotor blade assemblies described here is to add an OML tooled stub spar and IML tooled upper and lower ski portions, which snap fit together. The stub spar can join the upper and lower skin portions. Since the adjoining surfaces are now the tooled surfaces, variations in thicknesses are decreased. The stub spar creates a highly repeatable process for an IML tooled blade. The stub spar can be optimized in the lug region such that it is (1) designed for manufacturing (DFM), and (2) structurally designed for the mechanical performance of both the lug and the spar. That is, the stub spar can be designed to provide the correct stiffness as well as handle loads (i.e., stresses and strains) for each load case adequately.

A number of implementations have been described. Nevertheless, it will be understood that various modifications may be made without departing from the spirit and scope of the disclosure. For example, the blade assembly described here can be implemented to manufacture blade assemblies for unmanned aerial vehicles (UAVs), sail plains and other devices that implement thin, highly loaded, high aspect ratio structures which attach at a single root joint. In some implementations, the stub spar can be a stub clip. As an alternative to incorporating some of the spar and shear material in the stub spar, an outer mold line (OML) tooled clip can be used to tie the two halves of the blade assembly together.

The invention claimed is:

1. A rotorcraft rotor blade assembly comprising:
   an upper skin portion extending substantially a full span of the rotor blade assembly; and
   a lower skin portion extending substantially the full span of the rotor blade assembly; and
   wherein each of the upper skin portion and the lower skin portion include a composite material comprising a centrifugal material aligned substantially span-wise from the inboard end to more than 50% of the full span of the full span of the rotor blade assembly, a torque material torsionally wound around the upper skin portion and the lower skin portion from the inboard end to substantially the full span of the rotor blade assembly, and a shearing material aligned chord-wise from the inboard end to substantially all or part of the full span of the rotor blade assembly configured to carry at least substantially 30% of torsional and centrifugal rotor blade assembly loads.

2. The rotor blade assembly of claim 1, wherein each of the upper skin portion and the lower skin portion is configured to carry at least substantially 30% of torsional and centrifugal rotor blade assembly loads by less than substantially 50% of the full span of the rotor blade assembly.

3. The rotor blade assembly of claim 1, wherein each of the upper skin portion and the lower skin portion tapers from the inboard end of the rotor blade assembly towards the outboard end.

4. The rotor blade assembly of claim 1, wherein the thickness of each of the upper skin portion and the lower skin portion at the inboard end of the rotor blade assembly is about ten times the thickness of each of the upper skin portion and the lower skin portion at the outboard end of the rotor blade assembly.

5. The rotor blade assembly of claim 1, wherein, to carry at least substantially 30% of torsional and centrifugal rotor blade assembly loads, each of the upper skin portion and the lower skin portion comprises composite material fibers oriented to carry torsional rotor blade assembly loads and centrifugal rotor blade assembly loads.

6. The rotor blade assembly of claim 1, wherein the rotor blade assembly excludes a stub spar.

7. The rotor blade assembly of claim 1, further comprising a stub spar extending less than the full span of the rotor blade assembly.

8. The rotor blade assembly of claim 7, wherein the stub spar extends up to 50% of the full span of the rotor blade assembly.

9. The rotor blade assembly of claim 7, wherein the stub spar is positioned at the inboard end of the rotor blade assembly and wherein the stub spar tapers as the stub spar extends away from the inboard end of the rotor blade assembly.

10. The rotor blade assembly of claim 9, wherein a ratio of the thickness of upper skin portion material and lower skin portion material to the thickness of stub spar material at the inboard end is about 60:40.

11. The rotor blade assembly of claim 10, wherein the ratio increases along the full span of the rotor blade assembly from the inboard end to the outboard end.

12. A method of manufacturing a rotorcraft rotor blade assembly, the method comprising:
   forming an upper skin portion to extend substantially a full span of the rotor blade assembly;
   forming a lower skin portion to extend substantially the full span of the rotor blade assembly, wherein each of the upper skin portion and the lower skin portion includes a composite material comprising a centrifugal material aligned substantially span-wise from the inboard end to more than 50% of the full span of the full span of the rotor blade assembly, a torque material torsionally wound around the upper skin portion and the lower skin portion from the inboard end to substantially the full span of the rotor blade assembly, and a shearing material aligned chord-wise from the inboard end to substantially all or part of the full span of the rotor blade assembly to carry at least substantially 30% of torsional and centrifugal rotor blade assembly loads; and attaching the upper skin portion to the lower skin portion.

13. The method of claim 12, wherein forming the upper skin portion and forming the lower skin portion comprises including, in each of the upper skin portion and the lower skin portion, the composite material to carry at least substantially 30% of torsional and centrifugal rotor blade assembly loads by less than substantially 50% of the full span of the rotor blade assembly.

14. The method of claim 12, wherein each of the upper skin portion and the lower skin portion is formed to taper from the inboard end of the rotor blade assembly towards the outboard end.

15. The method of claim 12, wherein each of the upper skin portion and the lower skin portion is formed such that the thickness of each of the upper skin portion and the lower skin portion at the inboard end of the rotor blade assembly is about ten times a thickness of each of the upper skin portion and the lower skin portion at the outboard end of the rotor blade assembly.

16. The method of claim 12, further comprising:
positioning a stub spar between the upper skin portion and the lower skin portion, the stub spar extending less than the full span of the rotor blade assembly; and
attaching the upper skin portion and the lower skin portion to the stub spar.

17. The method of claim 16, wherein the stub spar extends up to 50% of the full span of the rotor blade assembly.

18. The method of claim 16, further comprising forming the stub spar to taper as the stub spar extends away from the inboard end of the rotor blade assembly.

19. The method of claim 18, wherein a ratio of the thickness of upper skin portion material and lower skin portion material to the thickness of stub spar material at the inboard end is about 60:40.

20. The method of claim 19, wherein the ratio increases along the full span of the rotor blade assembly from the inboard end to the outboard end.

21. A rotorcraft rotor blade assembly comprising:
an upper skin portion extending substantially a full span of the rotor blade assembly; and
a lower skin portion extending substantially the full span of the rotor blade assembly;
a stub spar extending less than the full span of the rotor blade assembly, wherein the stub spar is positioned at the inboard end of the rotor blade assembly and wherein the stub spar tapers as the stub spar extends away from the inboard end of the rotor blade assembly;
wherein each of the upper skin portion and the lower skin portion include a composite material configured to carry at least substantially 30% of torsional and centrifugal rotor blade assembly loads; and
wherein a ratio of the thickness of upper skin portion material and lower skin portion material to the thickness of stub spar material at the inboard end is about 60:40.

22. The rotor blade assembly of claim 21, wherein each of the upper skin portion and the lower skin portion is configured to carry at least substantially 30% of torsional and centrifugal rotor blade assembly loads by less than substantially 50% of the full span of the rotor blade assembly.

23. The rotor blade assembly of claim 21, wherein each of the upper skin portion and the lower skin portion tapers from the inboard end of the rotor blade assembly towards the outboard end.

24. The rotor blade assembly of claim 21, wherein the thickness of each of the upper skin portion and the lower skin portion at the inboard end of the rotor blade assembly is about ten times the thickness of each of the upper skin portion and the lower skin portion at the outboard end of the rotor blade assembly.

25. The rotor blade assembly of claim 21, wherein, to carry at least substantially 30% of torsional and centrifugal rotor blade assembly loads, each of the upper skin portion and the lower skin portion comprises composite material fibers oriented to carry torsional rotor blade assembly loads and centrifugal rotor blade assembly loads.

26. The rotor blade assembly of claim 21, wherein the rotor blade assembly excludes a stub spar.

27. The rotor blade assembly of claim 21, wherein the stub spar extends up to 50% of the full span of the rotor blade assembly.

28. The rotor blade assembly of claim 21, wherein the ratio increases along the full span of the rotor blade assembly from the inboard end to the outboard end.

29. A method of manufacturing a rotorcraft rotor blade assembly, the method comprising:
forming an upper skin portion to extend substantially a full span of the rotor blade assembly;
forming a lower skin portion to extend substantially the full span of the rotor blade assembly, wherein each of the upper skin portion and the lower skin portion includes a composite material to carry at least substantially 30% of torsional and centrifugal rotor blade assembly loads;
forming a stub spar to taper as the stub spar extends away from the inboard end of the rotor blade assembly, wherein a ratio of the thickness of upper skin portion material and lower skin portion material to the thickness of stub spar material at the inboard end is about 60:40;
positioning the stub spar between the upper skin portion and the lower skin portion, the stub spar extending less than the full span of the rotor blade assembly; and
attaching the upper skin portion and the lower skin portion to the stub spar.

30. The method of claim 29, wherein forming the upper skin portion and forming the lower skin portion comprises including, in each of the upper skin portion and the lower skin portion, the composite material to carry at least substantially 30% of torsional and centrifugal rotor blade assembly loads by less than substantially 50% of the full span of the rotor blade assembly.

31. The method of claim 29, wherein each of the upper skin portion and the lower skin portion is formed to taper from the inboard end of the rotor blade assembly towards the outboard end.

32. The method of claim 29, wherein each of the upper skin portion and the lower skin portion is formed such that the thickness of each of the upper skin portion and the lower skin portion at the inboard end of the rotor blade assembly is about ten times a thickness of each of the upper skin portion and the lower skin portion at the outboard end of the rotor blade assembly.

33. The method of claim 29, wherein the stub spar extends up to 50% of the full span of the rotor blade assembly.

34. The method of claim 29, wherein the ratio increases along the full span of the rotor blade assembly from the inboard end to the outboard end.

\* \* \* \* \*